United States Patent [19]

Niessner

[11] 3,975,049

[45] Aug. 17, 1976

[54] EMERGENCY ESCAPE HATCH ASSEMBLY FOR VEHICLES

[75] Inventor: Adam Niessner, Winnipeg, Canada

[73] Assignee: Motor Coach Industries Limited, Winnipeg, Canada

[22] Filed: Jan. 24, 1975

[21] Appl. No.: 543,865

[52] U.S. Cl. .............................. 296/137 B; 292/26; 292/196
[51] Int. Cl.² .......................................... B60J 7/04
[58] Field of Search .................... 296/137 R, 137 B; 98/2.14; 49/402, 485, 395, 394; 292/DIG. 65, 256.5, 24, 26, 27, 48, 49, 196, 197; 244/129 D, 129 W

[56] References Cited
UNITED STATES PATENTS

| | | | |
|---|---|---|---|
| 1,714,979 | 5/1929 | Goldsmith et al. | 244/129 D |
| 1,928,306 | 9/1933 | Brennan | 296/137 B X |
| 2,140,570 | 12/1938 | Young | 292/26 |
| 2,146,700 | 2/1939 | Peterson | 292/48 |
| 2,372,164 | 3/1945 | Woodhams | 98/2.14 |
| 2,586,648 | 2/1952 | Hale et al. | 292/26 |
| 2,762,473 | 9/1956 | Swerdlow | 49/402 X |
| 2,808,257 | 8/1955 | Brookbank | 244/129 D |
| 3,694,003 | 9/1972 | Radke | 292/DIG. 65 |

FOREIGN PATENTS OR APPLICATIONS

| | | | |
|---|---|---|---|
| 1,286,928 | 1/1969 | Germany | 296/137 B |

Primary Examiner—Robert J. Spar
Assistant Examiner—Donald W. Underwood
Attorney, Agent, or Firm—Stanley G. Ade

[57] ABSTRACT

The hatch is provided with a downturned lip engaging a flexible seal around the roof panel edge defining the escape hatch opening. Over center clamping means in conjunction with loose hinges, permits self alignment and complete sealing of the hatch when closed yet permits the hatch to be opened and hinged upwardly readily and easily when necessary.

8 Claims, 3 Drawing Figures

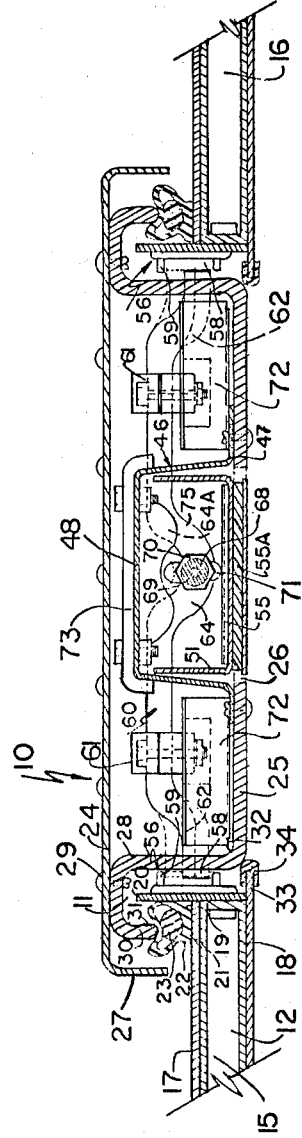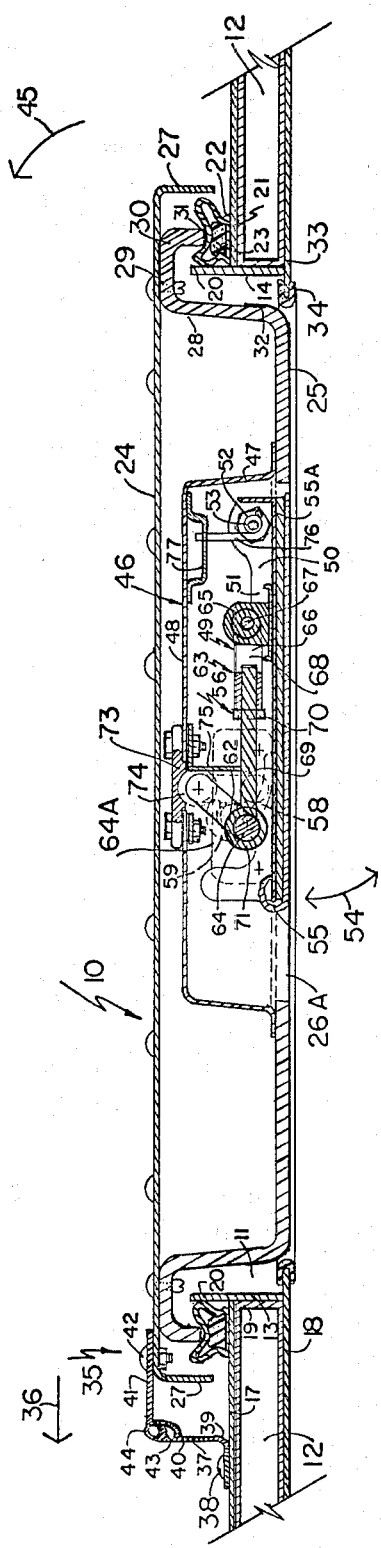

EMERGENCY ESCAPE HATCH ASSEMBLY FOR VEHICLES

BACKGROUND OF THE INVENTION

This invention relates to new and useful improvements in escape hatch assemblies, particularly suited for use in the roof areas of vehicles such as buses, motor coaches and the like.

Conventionally such devices include a rectangular opening with an escape hatch assembly held in the shut or closed position by means of various clamping devices. Some of the escape hatches are hinged to the roof by one edge thereof and others are held only by the clamping device so that when same is released, the escape hatch is completely free of the opening.

One of the requirements of escape hatches in vehicles is to provide an escape hatch which although it completely seals the opening when in the closed position, nevertheless is easily removed in an emergency to provide escape hatch facilities.

When the escape hatch component is hinged to the edge defining the opening, it is difficult to maintain an efficient seal without severe clamping pressures being required which, of course, make it somewhat difficult to operate in an emergency when it is desired to open the escape hatch.

When the escape hatch is a separate component, the escape hatch is often lost when operated and, furthermore, can readily become lost if opened inadvertently particularly while the vehicle is moving.

SUMMARY OF THE INVENTION

The present invention overcomes disadvantages inherent with current designs by providing the advantages of the hinged type escape hatch with the advantages of easy release and efficient sealing of the panel with the minimum of clamping pressures.

One of the principal objects of the invention is therefore to provide a device of the character herewithin described in which the escape hatch component is hinged to the roof adjacent the opening in such a way that efficient sealing of the hatch is provided when the hatch is closed.

Another object of the invention is to provide a device of the character herewithin described which includes over center operating means thus enabling the hatch to be closed and sealed with the minimum of clamping pressure yet at the same time providing a device which automatically breaks this seal when it is desired to open the hatch for emergency purposes.

Yet another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DETAILED DESCRIPTION OF THE DRAWINGS

FIG. 2 is a cross sectional view substantially along the line 2—2 of FIG. 1 but showing the hatch in the closed position within an escape hatch opening.

FIG. 3 is a view similar to FIG. 2 but taken along the line 3—3 of FIG. 1.

In the drawings like characters of reference indicate corresponding parts in the different figures.

DETAILED DESCRIPTION

Figure 1:
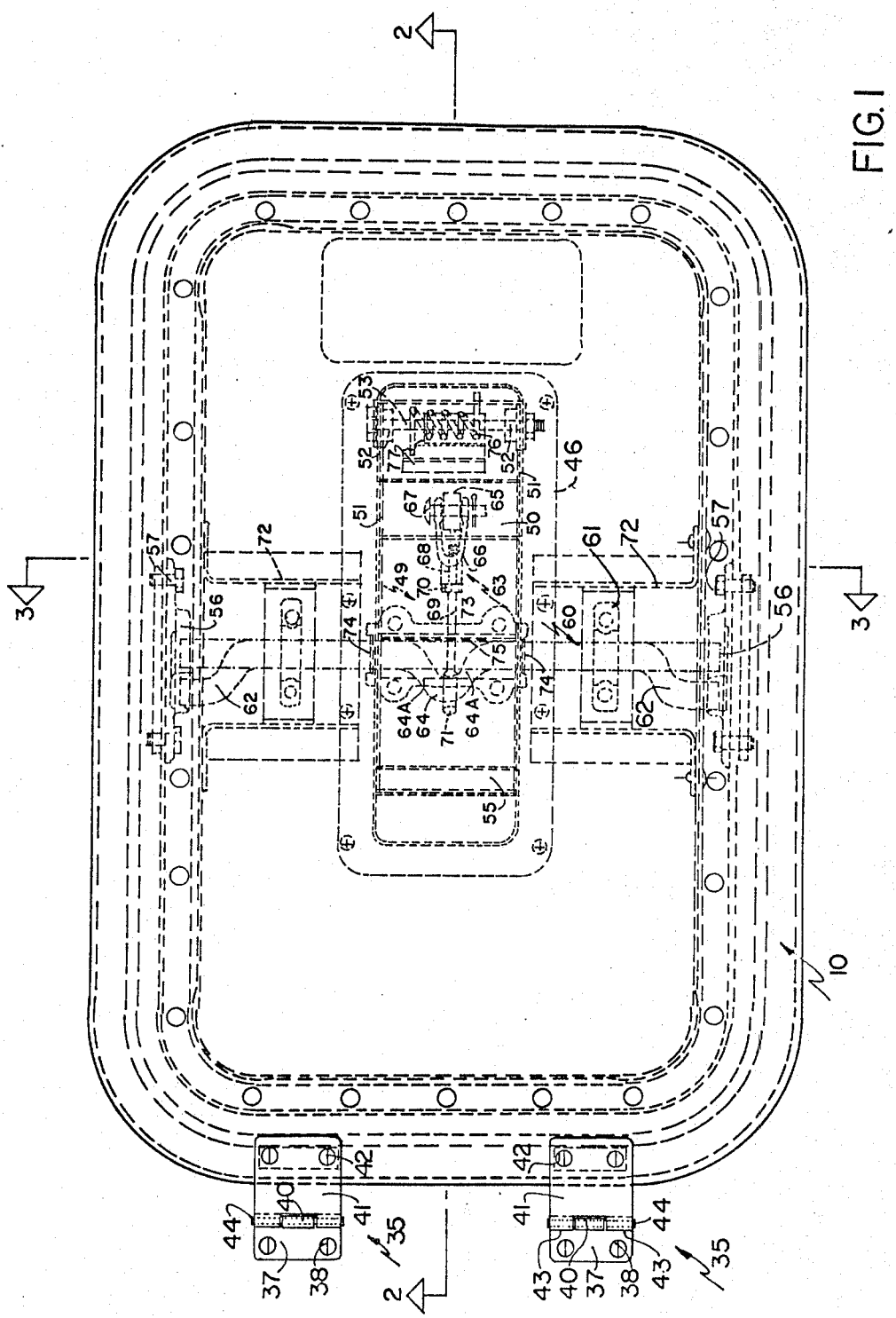
FIG. 1 is a top plan view of the hatch component per se, with various parts shown in phantom.

Proceeding therefore to describe the invention in detail, reference character 10 illustrates generally, the escape hatch component normally seated within an escape hatch opening 11 formed within the roof panel 12 of a vehicle (not illustrated), said opening being defined by the roof panel edges 13, 14, 15 and 16.

The roof panel includes upper panels 17 and lower panels 18 in spaced apart relationship with vertical walls 19 extending between these upper and lower panels at the edges 13, 14, 15 and 16 as clearly shown in FIGS. 2 and 3.

These vertical walls extend upwardly in the form of extensions 20 and a resilient seal collectively designated 21 is secured by adhesive (not illustrated) to the upper panel 17 of the roof and against the extensions 20 once again as clearly shown in FIGS. 2 and 3.

This resilient seal 21 includes an extruded hollow elastomeric strip 22 with a resilient sponge strip 23 situated therein to form a deformable seal clearly illustrated. The opening 11 is defined by the edges 13, 14, 15 and 16 and the vertical wall 19 and is substantially rectangular when viewed in plan.

The escape hatch component 10 is also substantially rectangular when viewed in plan and includes an upper planar panel 24 and a lower substantially planar panel 25 having a central opening 26 formed therein, the purpose of which will hereinafter be described.

The upper planar panel 24 extends beyond the boundaries of the opening 11 and terminates with downturned flanges 27 for weather shielding purposes.

The lower panel 25 includes upwardly extending perimetrically situated walls 28 from which extend outwardly situated horizontally positioned flanges 29. Downturned flanges 30 extend downwardly from the outer edges of these horizontal flanges 29 and the lower edges 31 of these downturned flanges 30 engage the aforementioned seal 21 as shown in FIGS. 2 and 3, it being understood that the walls 28, the flanges 29 and 30, extend all around the perimeter of the escape hatch component 10.

From the foregoing, and upon examination of FIGS. 2 and 3, it will be seen that the escape hatch component 10 seats relatively loosely within the opening 11 with the downturned flanges 30 engaging the seals 21 all around and it will be observed that the junctions between the lower panel 25 and the walls 28, identified by reference character 32, seats upon an inwardly extending flange 33 forming part of the lower panel 18 of the roof panel, the inner edge of this flange 33 being covered with trim material 34 so that the lower panel 25 of the hatch component 10 is substantially flush with the lower panel or inner surface 18 of the roof panel 12 when in the closed position as illustrated in FIGS. 2 and 3.

The escape hatch component 10 is hingedly secured to the roof 12 by means of a pair of hinge assemblies collectively designated 35 and it is desirable that these hinge components be situated on the roof panel 12 adjacent the front of the vehicle which is in the direction of arrow 36 so that if the escape hatch component is opened inadvertently while the vehicle is travelling, wind pressure will act to keep it closed rather than to assist the component from moving to the open position.

Each hinge component 35 includes a first hinge portion 37 secured to the upper panel 17 of the roof panel 12 by means of fasteners 38 and including an upwardly extending vertical leg 39 terminating in an oval looped portion 40 which acts as a hinge pin receiving portion situated centrally between the edges of the vertical portion 39 as shown in FIG. 1.

A second hinge portion 41 is secured by fasteners 42, to the upper panel 24 of the hatch component 10 adjacent one downturned flange 27 thereof and this portion 41 extends from the component 10 in substantially planar relationship with the upper panel 24 thereof. It terminates in a pair of looped portions 43 which carry a hinge pin 44, with the hinge pin passing loosely through the portion 40 of the first hinge portion 37.

This permits limited vertical movement of the hinge connection between the hatch hinge portion 41 and the roof hinge portion 37.

Alternatively, of course, the portions 43 may be of an oval configuration with the hinge pin 44 being held within a cylindrical sleeve portion 40 of the second hinge portion 37.

In either evident, this limited movement permits self-alignment and efficient sealing of the hatch component 10 within the opening 11 thus ensuring that all of the downturned flanges 30 engage the seals 21 in sealing relationship.

Means are provided to detachably lock the hatch component 10 in the closed position shown in FIGS. 2 and 3 and to release same when necessary, so that it may hinge upwardly in the direction of arrow 45 when it is desired to use the escape hatch opening 11.

A substantially rectangular casing or boxing 46 is secured around the rectangular opening 26 formed in the lower panel 25 of the hatch component 10 and this casing includes the upwardly extending walls 47 and the planar upper surface 48 which is situated in spaced and parallel relationship to the upper panel 24 as clearly shown.

The locking and release means collectively designated 49 is located within this recessed casing 46 and includes an operating handle 50. This handle comprises a pair of spaced and parallel walls 51 having bushings 52 at one end thereof to support a mounting pin or shaft 53 which is also engaged through the walls 47 of the casing 46 thus journalling the handle for pivotal movement in the direction of double headed arrow 54.

A handle plate assembly spans the base of these walls 50 and terminates with a curved finger gripping portion 55 at the opposite end thereof so that the handle can be grasped by the portion 55 and moved from the position shown in FIG. 2, to an open position as will hereinafter be described.

Also forming part of the locking and release means are a pair of ramp plates collectively designated 56, one each being secured to the vertical wall 19 of the opening 11 by means of bolts or similar fasteners 57.

These ramp plates 56 include the curved ramps 58 which terminate in locking-shaft-receiving portions 59 as shown in phantom in FIG. 2.

A locking shaft collectively designated 60 is journalled transversely of the hatch component 10 within pillar block bearings 61 and this locking shaft includes crank ends 62 which engage the ramps 58 and move to engagement with the locking-shaft-receiving portions 59 when in the position shown in FIG. 2.

Linkage means collectively designated 63 operatively connects the handle 50 with the locking shaft 60 and in this regard it will be observed that a crank 64 is formed intermediate the ends of the locking shaft having an offset in a similar direction to the crank ends 62.

Linkage means 63 includes a lug 65 secured to the portion 55A between the walls 51. A handle attaching yoke 66 is pivoted to this lug by means of a clevis pin 67 and this yoke includes a screw threaded central portion 68 through which the screw threaded end of a handle connecting rod 69 extends being locked in the desired position by means of a lock nut 70. This screw threaded engagement permits limited adjustment when initially installing the assembly.

The other end of the rod 69 is formed in an eye 71 and freely engages around the crank 64 of the locking shaft 60 as shown in phantom in FIG. 1 and in full line in FIG. 2.

The aforementioned bearings 61 are mounted within reinforcing channels 72 situated on each side of the casing 47 and a casting 73 is secured to the planar upper surface 46 of the casing 47 and includes further bearings 74 supporting the locking shaft 60. It also carries a stop plate 75 extending downwardly as illustrated in FIG. 2, which limits the movement of the crank 64 in the opening position of the assembly.

In operation, and considering first the position illustrated in FIGS. 1 and 2, the escape hatch component 10 is in closed position with the component being in sealing engagement within the opening 11. Under these circumstances it will be noted that the hinge pins 44 are in the uppermost position thus permitting the self alignment of the component and the efficient sealing thereof.

The handle assembly 49 is in the uppermost position illustrated with the portion 55A flush with the lower panel 25 of the component and closing off the underside of the component with the exception of the front portion 26A of the opening which is to permit the fingers of a person's hand to engage the portion 55 when it is desired to open the hatch. The handle 50 is held in the uppermost position by a coil spring 76 engaged around the spindle or shaft 53 which mounts the handle for pivotal movement, said spring reacting between the handle and an anchor point 77 in the form of a bracket secured to and depending from the upper panel 48 of the casing 46.

When it is desired to open the hatch, the portion 55 of the handle is grasped and moved downwardly in the direction of arrow 54. This pulls the linkage 63 over center and then rotates crank 64 together with the crank ends 62. This disengages the crank ends from the locking rod receiving portions 59 and these ends ride down the ramps 58 until the sides 64A of the central crank portion 64 strikes the stop plate 75. In this position, the crank ends 62 are clear of the portions 59 so that the hatch component 10 can be pushed upwardly in the direction of arrow 45 to hinge around the hinge pins 44 and lie flat upon the roof in a position approximately 180° from the position illustrated in FIG. 2.

In order to close the hatch, the movements are reversed with the hatch returning to the position illustrated in FIG. 2, the loose hinge pin 44 permitting self alignment within the opening so that when the handle is moved upwardly in the direction of arrow 54, to the position shown in FIG. 2, the crank ends ride up the ramps 58 and engage within the locking shaft retainer portions 59 thus pulling the hatch component 10 into sealing engagement with the seal 21 which are deflected by the edges 31 engaging these seals as clearly illustrated. The handle moves upwardly to the flush position with the linkage moving to the over center position and the handle is held in the uppermost position by the tension coil springs 76.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An escape hatch assembly for use in a vehicle roof which includes a substantially rectangular escape opening in said roof defined by roof panel edges; said escape hatch assembly comprising a substantially rectangular panel component having an upper side and a lower side and including an upper substantially planar panel and a lower panel spaced therefrom, engageable within said opening, overlapping edge flanges formed on the upper side of said component having dimensions larger than the dimensions of the escape opening, downward flanges formed on said overlapping edge flanges, resilient sealing means on said roof adjacent said roof panel edges defining said escape opening, engageable by the lower edges of said down turned flanges when in the closed position, hinge means operatively connecting said component by one side thereof to adjacent one edge of said panel defining said escape opening, and manually operable over center locking and release means on the underside of said escape hatch cooperating with opposite side edges of said escape opening to hold said escape hatch component in closed sealed relationship within said escape opening when in one position and to release said escape hatch component for upward hinging motion when in another position, said locking and release means comprising a ramp and a locking-shaft-receiving portion at one end thereof, secured to each side of said escape opening, a locking shaft journalled transversely to the underside of said hatch component, cranked ends on said shaft engagable with said ramp and said locking-shaft-receiving portion, a crank located between the ends of said shaft, an operating handle pivoted by one end thereof to the underside of said hatch component and over center linkage operatively connected between said handle intermediate the ends thereof and to said crank, said handle being movable from an open position whereby said cranked ends are disengaged from said locking-shaft-receiving portion, to a position substantially flush with said hatch component whereby said cranked ends are engaged within said locking-shaft-receiving portions and detachably held therein by said over center linkage.

2. The assembly according to claim 1 in which said lower panel of said escape hatch component is formed with upturned sides secured adjacent to the edges of said upper panel of said escape hatch component, said overlapping edge flanges and said downturned flanges being formed as extensions of said upturned sides.

3. The assembly according to claim 2 in which said lower panel of said escape hatch component is formed with an opening therein to receive said over center locking and release means, said hinge means being on the edge of said escape opening closest to the front end of the vehicle.

4. The assembly according to claim 3 in which said hinge means includes a first hinge plate secured to and extending above said roof adjacent one edge of said escape opening, said hinge plate including substantial oval hinge pin receiving portions formed thereon, above the surface of said roof panel, a second hinge plate secured to and extending from the upper surface of said escape hatch and lying substantially planar thereto, and hinge pin means operatively connecting said second hinge plate to said first hinge plate, said oval hinge pin receiving portion allowing limited vertical movement of said hinge pin means therein.

5. The assembly according to claim 2 in which said hinge means includes a first hinge plate secured to and extending above said roof adjacent one edge of said escape opening, said hinge plate including substantial oval hinge pin receiving portions formed thereon, above the surface of said roof panel, a second hinge plate secured to and extending from the upper surface of said escape hatch and lying substantially planar thereto, and hinge pin means operatively connecting said second hinge plate to said first hinge plate, said oval hinge pin receiving portion allowing limited vertical movement of said hinge pin means therein.

6. The assembly according to claim 1 in which said lower panel of said escape hatch component is formed with an opening therein to receive said over center locking and release means, said hinge means being on the edge of said escape opening closest to the front end of the vehicle.

7. The assembly according to claim 6 in which said hinge means includes a first hinge plate secured to and extending above said roof adjacent one edge of said escape opening, said hinge plate including substantial oval hinge pin receiving portions formed thereon, above the surface of said roof panel, a second hinge plate secured to and extending from the upper surface of said escape hatch and lying substantially planar thereto, and hinge pin means operatively connecting said second hinge plate to said first hinge plate, said oval hinge pin receiving portion allowing limited vertical movement of said hinge pin means therein.

8. The assembly according to claim 1 in which said hinge means includes a first hinge plate secured to and extending above said roof adjacent one edge of said escape opening, said hinge plate including substantial oval hinge pin receiving portions formed thereon, above the surface of said roof panel, a second hinge plate secured to and extending from the upper surface of said escape hatch and lying substantially planar thereto, and hinge pin means operatively connecting said second hinge plate to said first hinge plate, said oval hinge pin receiving portion allowing limited vertical movement of said hinge pin means therein.

* * * * *